US012052540B2

(12) United States Patent
Jin et al.

(10) Patent No.: US 12,052,540 B2
(45) Date of Patent: Jul. 30, 2024

(54) SPEAKER BOX

(71) Applicant: AAC Microtech (Changzhou) Co., Ltd., Changzhou (CN)

(72) Inventors: Xin Jin, Shenzhen (CN); Fan Zhang, Shenzhen (CN); Zhang Ren, Shenzhen (CN); Ronglin Linghu, Shenzhen (CN); Wei Song, Shenzhen (CN)

(73) Assignee: AAC MICROTECH (CHANGZHOU) CO., LTD., Changzhou (CN)

( * ) Notice: Subject to any disclaimer, the term of this patent is extended or adjusted under 35 U.S.C. 154(b) by 166 days.

(21) Appl. No.: 17/833,879

(22) Filed: Jun. 6, 2022

(65) Prior Publication Data

US 2023/0319462 A1 Oct. 5, 2023

(30) Foreign Application Priority Data

Mar. 30, 2022 (CN) ......................... 202220734635.4

(51) Int. Cl.

| | |
|---|---|
| ***H04R 1/28*** | (2006.01) |
| ***H04R 1/02*** | (2006.01) |
| ***H04R 7/12*** | (2006.01) |
| ***H04R 9/02*** | (2006.01) |
| ***H04R 9/06*** | (2006.01) |

(52) U.S. Cl.
CPC ............. *H04R 1/288* (2013.01); *H04R 1/023* (2013.01); *H04R 1/025* (2013.01); *H04R 7/12* (2013.01); *H04R 9/025* (2013.01); *H04R 9/06* (2013.01); *H04R 2400/11* (2013.01); *H04R 2499/11* (2013.01)

(58) Field of Classification Search
CPC ........ H04R 1/288; H04R 1/023; H04R 1/025; H04R 7/12; H04R 9/025; H04R 9/06; H04R 2400/11; H04R 2499/11; H04R 1/021; H04R 2201/028; H04R 1/2884
See application file for complete search history.

(56) References Cited

U.S. PATENT DOCUMENTS 10,117,018 B2 * 10/2018 Shao .................... H04R 1/2842
10,178,467 B2 * 1/2019 Hou ..................... H04R 1/2803

(Continued)

FOREIGN PATENT DOCUMENTS

CN 208638694 U * 3/2019 ........... H04R 1/2811
WO WO-2020024522 A1 * 2/2020 ............ H04R 9/025
WO WO-2020134460 A1 * 7/2020 ............ H04R 1/025

*Primary Examiner* — Akelaw Teshale

(74) *Attorney, Agent, or Firm* — W&G Law Group

(57) ABSTRACT

The present invention provides a speaker box including a housing body with a containment space and a sounding unit. The housing body includes a sound aperture. The sounding unit includes a vibration system with a vibration diaphragm and a magnetic circuit system. The vibration diaphragm divides the containment space into front cavity and rear cavity. The speaker box includes a breathable separator located in the rear cavity to form a sound absorbing cavity. The lower housing includes a bottom wall and a side wall bent and extended from the bottom wall. The breathable separator includes a fixed part fixed to the upper housing, a breathable part having several air circulation holes, and a sealed part extending from the breathable part and sealing the through hole. The speaker box of the present invention effectively reduces the height of the product and reduces the cost.

8 Claims, 4 Drawing Sheets

(56) References Cited

U.S. PATENT DOCUMENTS

| | | | | | |
|---|---|---|---|---|---|
| 10,771,892 | B1 * | 9/2020 | Morozov | G01V 1/133 | |
| 11,638,097 | B1 * | 4/2023 | Jin | H04R 7/20 | 381/412 |
| 2016/0088385 | A1 * | 3/2016 | Fan | B29B 11/04 | 29/896.2 |
| 2016/0227304 | A1 * | 8/2016 | Xu | H04R 1/021 | |
| 2016/0295316 | A1 * | 10/2016 | Shao | H04R 1/2826 | |
| 2018/0206011 | A1 * | 7/2018 | Han | H04R 1/2842 | |
| 2019/0069076 | A1 * | 2/2019 | Tsang | H05K 5/0095 | |
| 2019/0253803 | A1 * | 8/2019 | Davis | H04R 1/025 | |
| 2020/0053470 | A1 * | 2/2020 | Gu | H04R 1/2811 | |
| 2020/0213754 | A1 * | 7/2020 | Wang | H04R 1/02 | |
| 2021/0029460 | A1 * | 1/2021 | Huang | H04R 9/06 | |
| 2021/0051816 | A1 * | 2/2021 | Huang | H04M 1/0202 | |
| 2021/0165249 | A1 * | 6/2021 | Wang | H04R 1/02 | |
| 2021/0321191 | A1 * | 10/2021 | Wang | H04R 9/06 | |
| 2023/0247348 | A1 * | 8/2023 | Yang | H04R 1/288 | 381/353 |
| 2023/0283945 | A1 * | 9/2023 | Hu | H04R 1/023 | 381/335 |
| 2023/0328441 | A1 * | 10/2023 | Jin | H04R 9/025 | |

* cited by examiner

SPEAKER BOX

FIELD OF THE PRESENT DISCLOSURE

The present invention relates to electroacoustic transducers, in particular to a speaker box used in a portable electronic device.

DESCRIPTION OF RELATED ART

With the advent of the mobile Internet era, the number of smart mobile equipment continues to rise. Among the many mobile equipment, the mobile phone is undoubtedly the most common and portable mobile terminal equipment. At present, the functions of mobile phones are extremely diverse, one of which is the high-quality music function. Therefore, the speaker box for playing sound is widely used in the current smart mobile equipment.

The speaker box includes a housing body, a sounding unit accommodated in the housing body, and a metal breathable separator covering the sounding unit. In the related art, the housing body encapsulates the sounding unit and the metal breathable separator, and it is necessary to reserve a certain distance for the metal breathable separator, which will inevitably lead to an increase in the height of the entire speaker box, which is not conducive to the trend of device miniaturization.

Therefore, it is necessary to provide a new speaker box to solve the above technical problems.

SUMMARY OF THE PRESENT INVENTION

The purpose of the present invention is to prepare a speaker box with smaller size.

Accordingly, the present invention provides a speaker box, which includes a housing body with a containment space and a sounding unit fixedly accommodated in the containment space. The housing body includes a sound aperture connected with the containment space. The sounding unit includes a vibration system with a vibration diaphragm and a magnetic circuit system. The vibration diaphragm divides the containment space into front cavity and rear cavity.

The housing body includes a lower housing and an upper housing. The speaker box includes a breathable separator located in the rear cavity. The breathable separator is enclosed with the upper housing and lower housing to form a sound absorbing cavity. The lower housing includes a bottom wall and a side wall bent and extended from the bottom wall.

The bottom wall is provided with a through hole exposing part of the magnetic circuit system. The breathable separator includes a fixed part fixed to the upper housing, a breathable part having several air circulation holes, and a sealed part extending from the breathable part and sealing the through hole. Compared with related technologies, the speaker box of the present invention effectively reduces the height of the product and reduces the cost.

As an improvement, an outward-facing surface of the sealed part of the breathable separator does not exceed an outward-facing surface of the bottom wall.

As an improvement, the upper housing includes:

- a cover plate that forms the front cavity with the vibration diaphragm;
- and a bracket located between the cover plate and the side wall of lower housing; and wherein

- the bracket includes a first extension part connected to the side wall and a second extension part extending from the first extension part into the rear cavity; the fixed part of the breathable separator is fixedly connected to the second extension part.

As an improvement, the sealed part of the breathable separator is formed by covering an adhesive layer on the same structure as the breathable part.

As an improvement, an adhesive seal is provided between the sealed part of the breathable separator and the inner wall of the bottom wall forming the through hole.

As an improvement, the magnetic circuit system includes a magnetic bowl and a magnet assembly fixed to the magnetic bowl. The magnetic bowl is exposed to the through hole; an adhesive seal is arranged between the sealed part of the breathable separator and the magnetic bowl.

As an improvement, a surface of the sealed part of the breathable separator facing the containment space is fixedly connected to the magnet assembly.

As an improvement, the sounding unit includes an elastic support member for fixing the vibration system to the housing body; the elastic support member is fixed on the bracket and sandwiched between the second extension part and the fixed part of the breathable separator.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
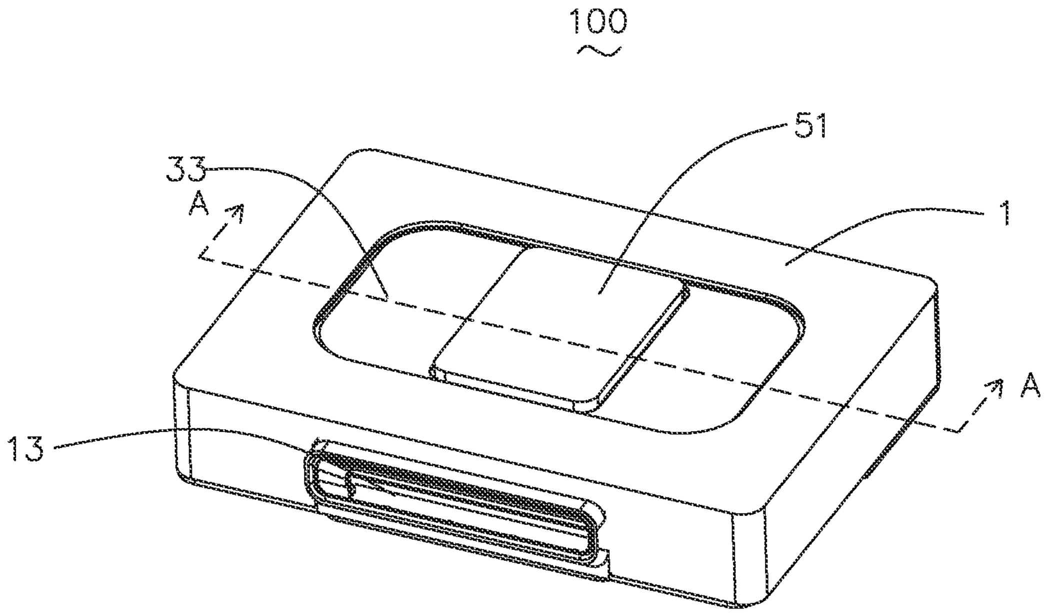
FIG. 1 is an isometric view of a speaker box in accordance with an embodiment of the present invention.
Figure 2:
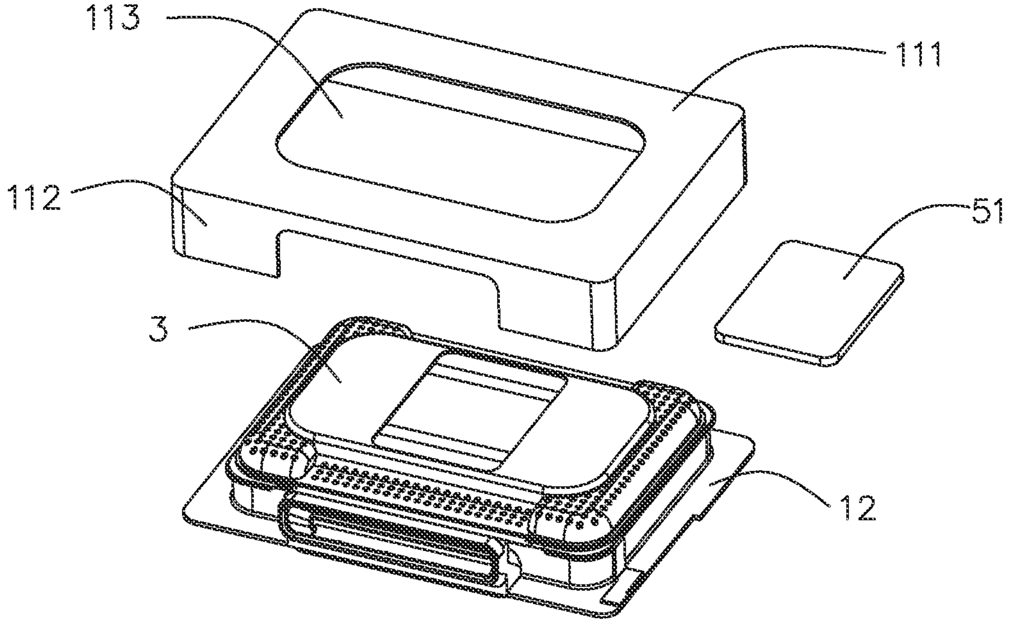
FIG. 2 is a partially exploded view of the speaker box as shown in FIG. 1.
Figure 3:
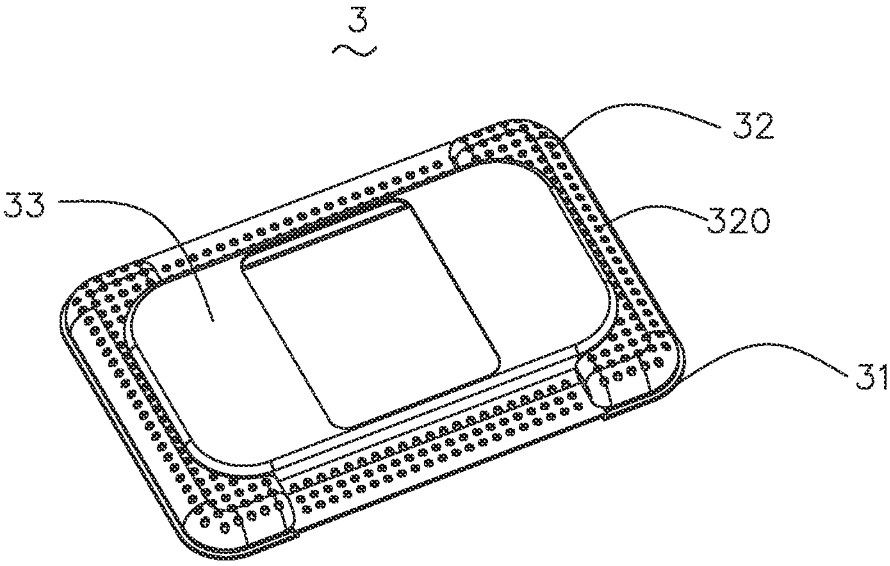
FIG. 3 is an isometric view of a breathable separator in the speaker box as shown in FIG. 1.
Figure 4:
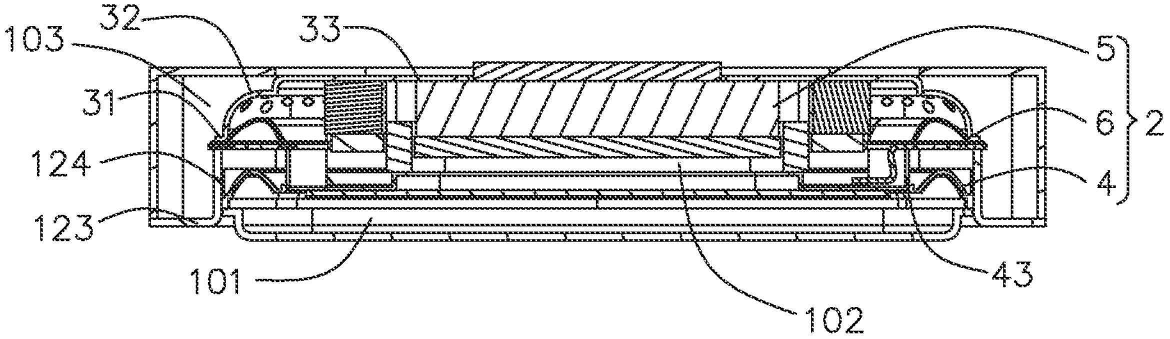
FIG. 4 is a cross-sectional view of the speaker box taken along line AA in FIG. 1.
Figure 5:
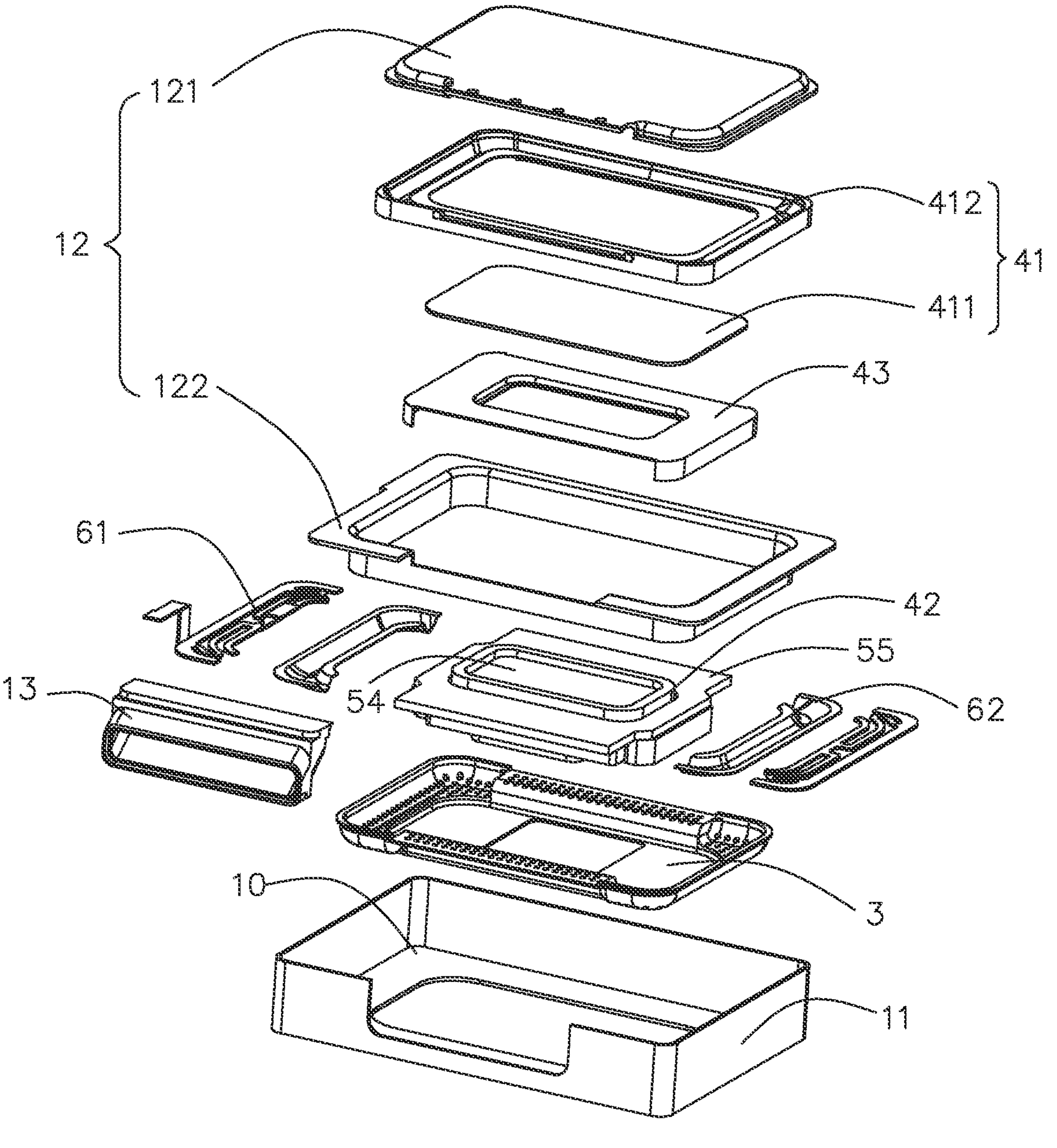
FIG. 5 is an exploded view of the speaker box as shown in FIG. 1.
Figure 6:
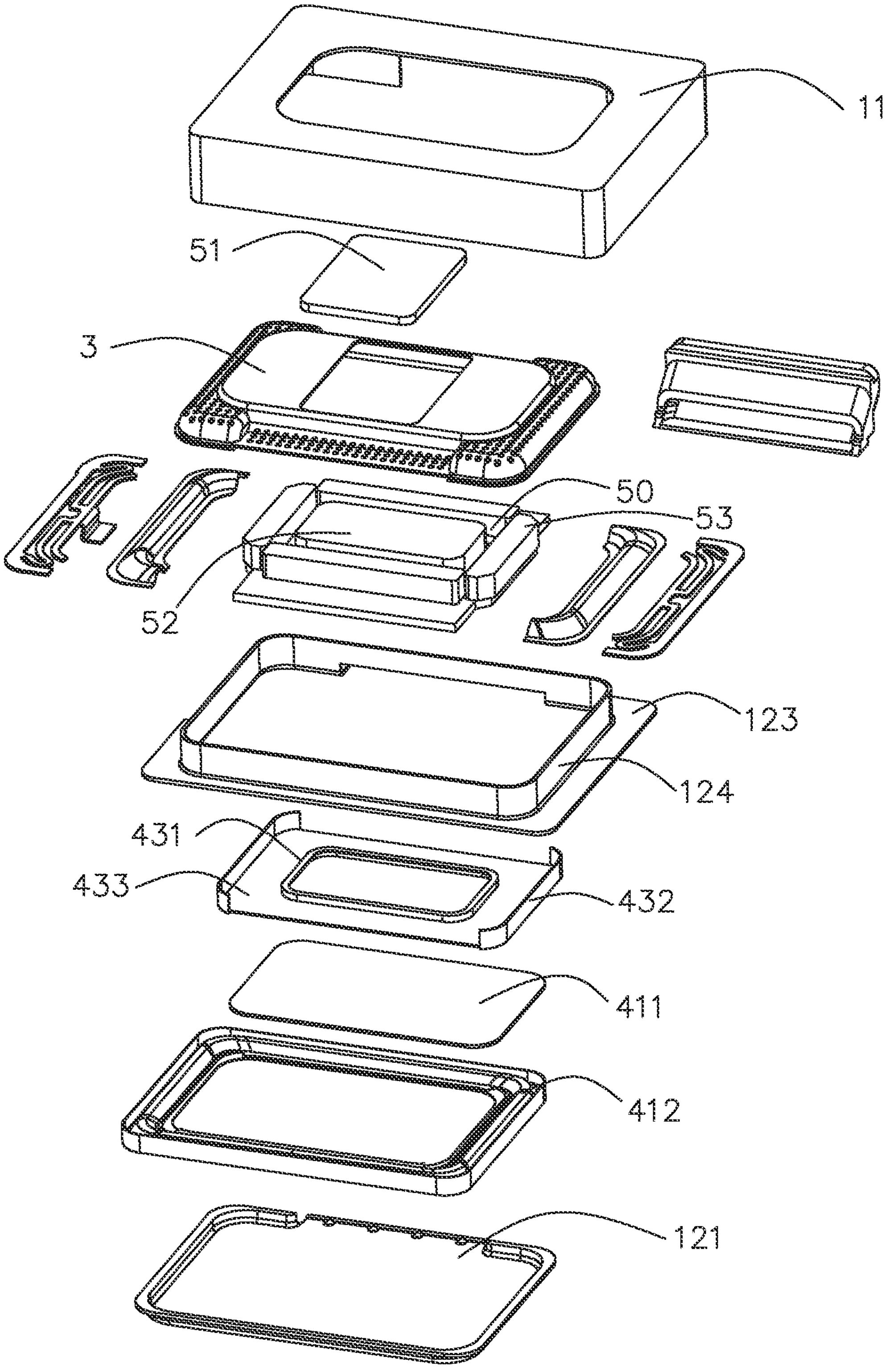
FIG. 6 is an exploded view, from another aspect, of the speaker box as shown in FIG. 1.

Please refer to FIGS. 1-6. The present invention provides a speaker box 100, which includes a housing body 1 with a containment space 10, a sounding unit 2 and a breathable separator 3 fixedly accommodated in the containment space 10.

The housing body 1 includes a lower housing 11 and an upper housing 12 assembled with the lower housing 11 to form the containment space 10, the lower housing 11 is provided with a sound aperture 13 connected with the containment space 10. The lower housing 11 includes a bottom wall 111 and a side wall 112 bent and extended from the bottom wall 111, the bottom wall 111 is provided with a through hole 113. The upper housing 12 includes a cover plate 121 and a bracket 122 disposed between the cover plate 121 and the side wall of the lower housing 11. The bracket 122 includes a first extension part 123 connected to the side wall 112 and a second extension part 124 extending from the first extension part 123 into the containment space 10. The first extension part 123 is fixedly connected to the side wall 112. The cover plate 121 is fixedly connected to the second extension part 124.

The sounding unit 2 includes a vibration system 4, a magnetic circuit system 5 with a magnetic gap 50, and an elastic support member 6 for fixing the vibration system 4 to the housing body 1. The magnetic circuit system 5 drives the vibration system 4 to vibrate and sound. The magnetic circuit system 5 is partially exposed to the through hole 113 on the bottom wall 111. The vibration system 4 includes a vibration diaphragm 41, a voice coil 42 inserted in the magnetic gap 50 to drive the vibration diaphragm 41 to vibrate and produce sound, and a voice coil skeleton 43 connecting the vibration diaphragm 41 and the voice coil 42. The elastic support member 6 connects the housing body 1 and the voice coil skeleton 43. The vibration diaphragm 41 divides the containment space 10 into a front cavity 101 connected with the sound aperture 13 and a rear cavity 102 opposite the front cavity 101. The cover plate 121 and the vibration diaphragm 41 enclose the front cavity 101.

The vibration diaphragm 41 includes a dome part 411 and an annular suspension part 412. The suspension part 412 is arranged around the dome part 411. The voice coil skeleton 43 includes a first fixed part 431 fixedly connected to the voice coil 42, a second fixed part 432 fixedly connected to the elastic support member 6, and a connection part 433 connecting the first fixed part 431 and the second fixed part 432. The connection part 433 is in the shape of a flat plate, and is connected with the dome part 411 and the suspension part 412 of the vibration diaphragm 41 close to the side of the voice coil 42. The first fixed part 431 of the voice coil skeleton 43 is formed by bending and extending from the inner end of the connection part 433 in a direction away from the vibration diaphragm 41. The second fixed part 432 is formed by bending and extending from the outer end of the connection part 433 in a direction away from the vibration diaphragm 41. And the interval of first fixed part 431 and second fixed part 432 is set oppositely. The first fixed part 431 extends toward the voice coil 42 and is fixedly connected to the end of the voice coil 42 close to the vibration diaphragm 41. The second fixed part 232 extends toward the direction of the elastic support member 6 and is fixedly connected with the elastic support member 6.

The magnetic circuit system 5 includes a magnetic bowl 51, a main magnet 52 fixed to the magnetic bowl 51, a secondary magnet 53 arranged spaced apart from the main magnet 52 to form the magnetic gap 50, a main pole core 54 arranged on the main magnet 52, and a main pole core 54 arranged on the main magnet 52, a secondary pole core 55 arranged on the secondary magnet 53. The number of the secondary magnets 53 is four, and the four secondary magnets 53 are arranged around the main magnet 52. The main magnet 52, the secondary magnet 53, the main pole core 54, and the secondary pole core 55 constitute a magnet assembly.

The elastic support member 6 includes a flexible circuit board 61 fixed to the side of the voice coil skeleton 43 away from the vibration diaphragm 41 and a support vibration diaphragm 62 fixed to the side of the flexible circuit board 61 away from the vibration diaphragm 41. The number of the support vibration diaphragm 62 is two. One of the support vibration diaphragms 62 is provided on each of the two short axis directions of the speaker box 100. The number of the flexible circuit boards 61 is also two. One of the flexible circuit boards 61 is provided on each of the two short axis directions of the speaker box 100.

The breathable separator 3 is arranged around the outer periphery of the sounding unit 2, and is enclosed with the upper housing 12 and the lower housing 11 to form a sound absorbing cavity 103 for accommodating the sound absorbing material. The sound absorbing cavity 103 is part of the rear cavity 102. The sound absorbing cavity 103 can be filled with sound absorbing particles. The breathable separator 3 includes a fixed part 31 fixed with the upper housing 12, a breathable part 32 with a plurality of air circulation holes 320 extending from the fixed part 31 to the bottom wall 111, and a sealed part 33 that extends further bent from the breathable part 32 and seals the through hole 113. The fixed part 31 is fixedly connected to the second extension part 124 of the bracket 122. Preferably, the fixed part 31 is fixed to the second extension part 124 through the elastic support member 6. That is, the elastic support member 6 is sandwiched between the second extension part and the fixed part 31 of the breathable separator 124. The fixed part 31 and the breathable part 32 are both circular structures, and the seal 33 is only arranged in the short axis direction in this embodiment. In other embodiment, it can set the shape according to actual needs, such as circular structure.

The outward facing surface of the sealed part 33 does not exceed the outward facing surface of the bottom wall 111. The surface of the sealed part 33 facing the containment space 10 is fixedly connected with the magnet assembly. Several air circulation holes 320 are provided on the breathable part 32. The sealed part 33 forms a sealed structure by covering the same structure as the breathable part 32 with an adhesive layer. Of course, the sealed part 33 can also directly form a sealed structure without air circulation holes when forming the breathable separator 3. An adhesive seal is provided between the sealed part 33 and the bottom wall 111 forming the inner wall of the through hole 113, and an adhesive seal is also provided between the sealed part and the magnetic bowl 51.

Compared with the related art, the speaker box of the present invention includes a housing body with a containment space and a sounding unit fixedly accommodated in the containment space. The housing body includes a sound aperture communicating with the containment space. The sounding unit includes a vibration system with a vibration diaphragm and a magnetic circuit system. The vibration diaphragm divides the containment space into a front cavity connected with the sound aperture and a rear cavity opposite the front cavity. The housing body includes a lower housing and an upper housing assembled with the lower housing to form the containment space. The speaker box also includes a breathable separator located in the rear cavity. The breathable separator is enclosed with the upper housing and the lower housing to form a sound absorbing cavity for accommodating sound absorbing material. The lower housing includes a bottom wall and a side wall bent and extended from the bottom wall. The bottom wall is provided with a through hole exposing part of the magnetic circuit system.

The breathable separator includes a fixed part fixed to the upper housing, a breathable part extending from the fixed part toward the bottom wall, and a sealed part extending from the breathable part and sealing the through hole. Thus, a through hole is provided on the housing body, and a sealed part is formed directly on the breathable separator to seal the through hole on the bottom wall of speaker box. The sealed part of the breathable separator directly constitutes a part of the housing body. It saves the space that the housing body needs to reserve for breathable separator. The volume of the sound absorbing cavity is maximized, and the acoustic performance is better. At the same time, the height of the speaker box is lower, and the device is more miniaturized.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker box, comprising:

a housing body including a containment space formed by a lower housing and an upper housing, and a sound aperture communicating with the containment space;

a sounding unit accommodated in the containment space, including a vibration system with a vibration diaphragm fixed with the upper housing and dividing the containment space into a front cavity connected with the sound aperture and a rear cavity opposite to the front cavity, and a magnetic circuit system;

a breathable separator located in the rear cavity;

wherein the lower housing includes a bottom wall and a side wall bent and extended from the bottom wall; the side wall is fixed with the upper housing; the bottom wall includes a through hole exposing part of the magnetic circuit system; the breathable separator includes a fixed part fixed with the upper housing, a breathable part with air circulation holes extending from the fixed part toward the bottom wall, and a sealed part extending from the breathable part and sealing the through hole; the sealed part is fixed with the part of the magnetic circuit system exposed from the through hole; the breathable separator, cooperatively with the upper housing and the lower housing, divides a sound absorbing cavity for accommodating sound absorbing material from the rear cavity, and the rest of the rear cavity is enclosed by the vibration diaphragm, the upper housing, the breathable separator and the magnetic circuit system.

2. The speaker box as described in claim 1, wherein an outward-facing surface of the sealed part of the breathable separator does not exceed an outward-facing surface of the bottom wall.

3. The speaker box as described in claim 1, wherein the upper housing includes:

a cover plate that forms the front cavity with the vibration diaphragm;

and a bracket located between the cover plate and the side wall of lower housing; and wherein the bracket includes a first extension part connected to the side wall and a second extension part extending from the first extension part into the rear cavity; the fixed part of the breathable separator is fixedly connected to the second extension part.

4. The speaker box as described in claim 1, wherein the sealed part of the breathable separator is formed by covering an adhesive layer on the same structure as the breathable part.

5. The speaker box as described in claim 1, wherein an adhesive seal is provided between the sealed part of the breathable separator and the inner wall of the bottom wall forming the through hole.

6. The speaker box as described in claim 1, wherein the magnetic circuit system includes a magnetic bowl and a magnet assembly fixed to the magnetic bowl. The magnetic bowl is exposed to the through hole; an adhesive seal is arranged between the sealed part of the breathable separator and the magnetic bowl.

7. The speaker box as described in claim 6, wherein a surface of the sealed part of the breathable separator facing the containment space is fixedly connected to the magnet assembly.

8. The speaker box as described in claim 3, wherein the sounding unit includes an elastic support member for fixing the vibration system to the housing body; the elastic support member is fixed on the bracket and sandwiched between the second extension part and the fixed part of the breathable separator.

* * * * *